H. C. JONES.
STAVE-BASKET.

No. 169,448.  Patented Nov. 2, 1875.

Witnesses:

Inventor:
Horace C. Jones
by
Mason, Fenwick & Lawrence
Atty

UNITED STATES PATENT OFFICE.

HORACE C. JONES, OF DOWAGIAC, MICHIGAN.

IMPROVEMENT IN STAVE-BASKETS.

Specification forming part of Letters Patent No. 169,448, dated November 2, 1875; application filed August 17, 1875.

CASE C.

*To all whom it may concern:*

Be it known that I, HORACE C. JONES, of Dowagiac, county of Cass and State of Michigan, have invented a new and Improved Stave-Basket; and I do hereby declare that the following is a full, clear, and exact description thereof, reference being had to the accompanying drawings making part of this specification, in which—

Figure 1:
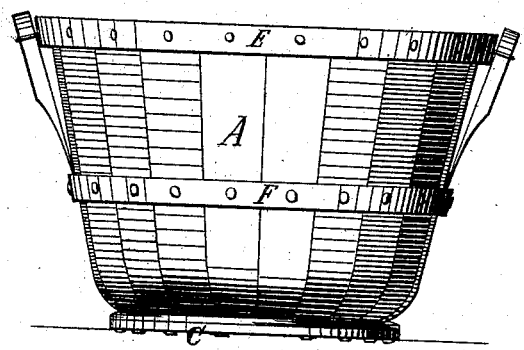
Figure 2:
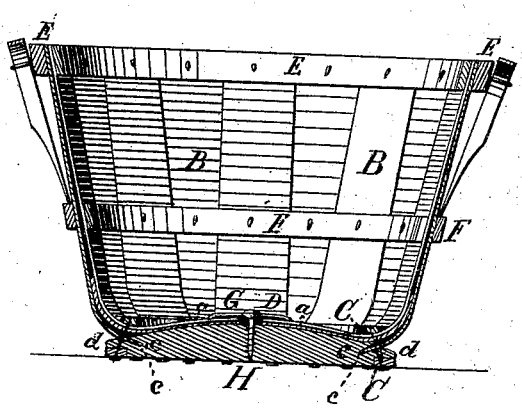
Figure 3:
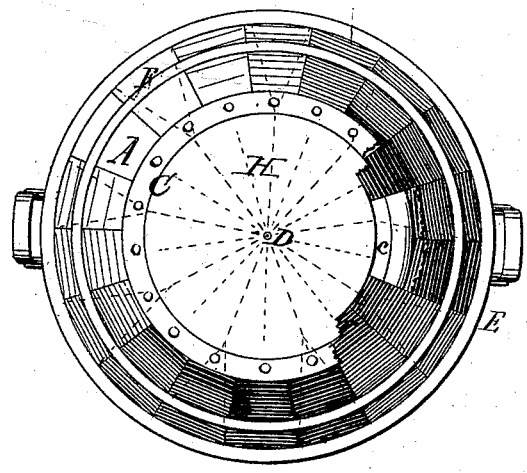

Figure 1 is a side elevation of my improved basket; Fig. 2 a vertical central section, and Fig. 3 an inverted bottom view, of the same.

My basket is composed of a single series of outer staves, A, which come edge to edge within a given circle, and of two series of inner lining-staves, B B, which lap upon one another at the bottom of the basket. The staves of both inner series gradually come within the same circle as they rise to the top of the basket. The points or lower ends $a$ of the staves B are tapered in V-form from the bottom hoops C C to the central rivet D of the bottom of the basket, so as to adjoin one another, and the tapered ends of one of the lining series lap upon the tapered ends of the staves of the other lining series, so as to close the joints between the tapered ends of the innermost lining series. The three series of staves A and B B are bound together and strengthened at the top and middle of the body of the basket by the usual hoops E E and F F. And at the bottom of the basket, on the inside, the extremities of the tapered ends of the lining series are covered and confined by a central riveted washer, G. The tapered ends of these staves, and the ends of the outer series of staves, are covered on the outside of the bottom of the basket by a circular convex board, H, which has a horizontal or slightly oblique groove, $c$, in its conical or spherical periphery for the reception of the ends of the outer series of staves A, and is provided with a rabbet around the lowermost part of its circumference for the reception of one of the bottom hoops C. The three series of staves at the bottom of the basket are bound together by means of the rivet D, passed down through the center of the washer G and convex circular board H, and suitably clinched, and by nails passed through the bottom hoops C C, board H, and staves A B B, as shown.

I do not claim under this patent an oblique groove in the periphery of the bottom of a basket, as shown in Russell's patent of 1872.

What I claim is—

1. A stave-basket having the rabbeted or shouldered board H extended between the outer bottom hoop and the outer staves, substantially as described.

2. The basket with outer staves placed edge to edge, and the inner series of lining-staves tapered at their lower ends and lapped upon one another at the bottom of the basket, and both the inner and outer series bound together and strengthened at the bottom of the basket by a central rivet and washer, and nails, and inner and outer hoops C C, and shouldered board H, extended between the outer bottom hoop and the bottom of the basket, substantially as described.

3. A basket having a bottom board, which is convex on its top, into which the lower ends of the outer staves are inserted, while a lower portion of said bottom board extends outwardly beyond the point where the staves enter, substantially as and for the purpose described.

HORACE C. JONES.

Witnesses:
 B. M. SCHERMERHORN,
 WILLIAM H. TICE.